G. & A. NIEMAN.
CHICKEN FEEDER.
APPLICATION FILED APR. 12, 1911.
1,029,623.
Patented June 18, 1912.
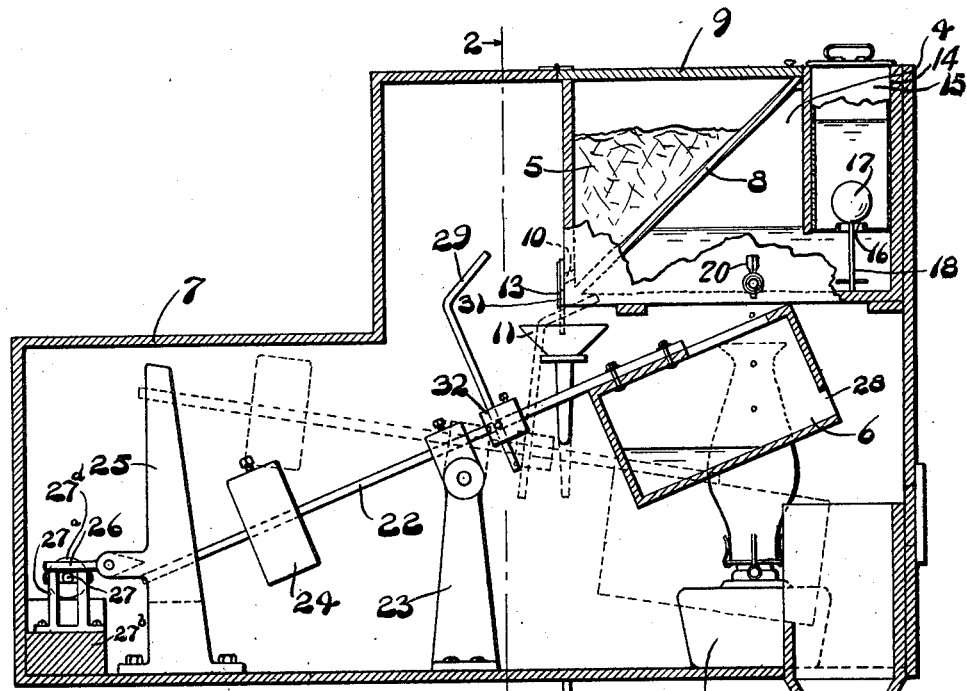
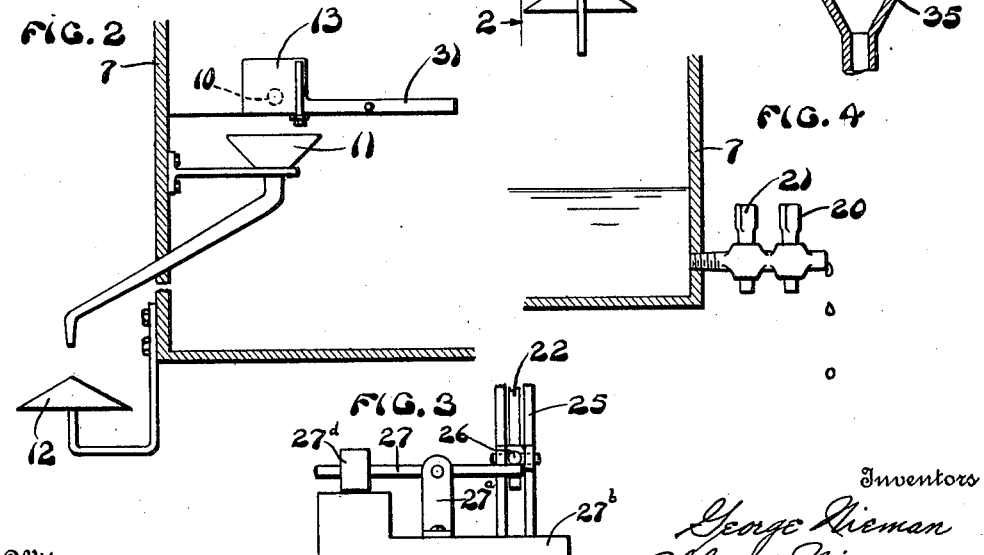
Witnesses
Inventors
George Nieman
Albert Nieman
By Walter G. Murray
Attorney

UNITED STATES PATENT OFFICE.

GEORGE NIEMAN AND ALBERT NIEMAN, OF SAYLER PARK, OHIO.

CHICKEN-FEEDER.

1,029,623.  Specification of Letters Patent.  Patented June 18, 1912.

Application filed April 12, 1911. Serial No. 620,527.

*To all whom it may concern:*

Be it known that we, GEORGE NIEMAN and ALBERT NIEMAN, both citizens of the United States of America, and residents of Sayler Park, county of Hamilton, and State of Ohio, have invented certain new and useful Improvements in Chicken-Feeders, of which the following is a specification.

An object of this invention is to produce a chicken feeder provided with means for delivering regulable amounts of water and feed at determined intervals.

A further object is to produce a feeder provided with means for delivering feed and water at determined intervals, and also provided with means for keeping the feed and the water warm, during cold weather.

These and other objects we attain in a feeder embodying the features herein described, and illustrated in the drawings accompanying and forming a part of this application.

In the drawings, Figure 1 is a sectional view of a feeder embodying our invention. Fig. 2 is a fragmental sectional view along the line 2—2 of Fig. 1, and illustrates the means employed for delivering feed from the feeder. Fig. 3 is an end elevation of the levers shown at the left of Fig. 1. Fig. 4 is a fragmental sectional view of the water supply tank and illustrates the arrangement of the delivery valves.

The feeder illustrated as an embodiment of our invention includes a water supply tank 4, a feed supply tank 5, a balanced delivery tank 6 for delivering the water received from the supply tank, means for controlling the operation of the delivery tank, means actuated by the delivery tank for delivering a supply of feed from the tank 5, and means for keeping the supply of feed and the water warm prior to their delivery from the feeder. The water supply tank 4 and the feed tank 5 are inclosed within a rectangular box, which is preferably located in one corner of the casing 7 of the feeder. The two tanks are separated from each other by a partition 8, which extends obliquely across the box, and is so located that each tank is accessible from the top of the feeder. The feed tank 5 is located in the box above the partition 8 and a swinging lid 9, mounted on the top of the casing 7, provides access into it. A feed delivery port 10 is provided at the bottom of the tank 5 and is adapted to deliver feed to a funnel 11, through which it is discharged from the feeder on to a spreading cone 12, which is mounted on the outside of the casing 7. A pivotally mounted gate 13 controls the delivery of feed through the port 10, and is operated through the agency of the delivery tank 6, as will hereinafter be described.

An opening 14 is provided in the top of the casing 7 and is adapted to receive a vessel 15, which extends downward into the tank 4, and is adapted to maintain the water level in the tank substantially constant. The vessel 15 is provided with a port 16, which is provided with a ball valve 17, adapted to normally close the port. A stem 18 is secured to the ball valve 17 and projects through the port 18. When the vessel 15 is in place in the tank 8, it is inverted and suspended from the edges of the port 14, so that the end of the stem 18 will abut against the bottom of the tank 8 and hold the valve 17 open. When the vessel 15 is in this position, it delivers water to the tank 8 until the water level in the tank rises to the level of the port and then maintains the water level in the tank substantially constant, by delivering water to the tank, as soon as the level in the tank falls below the port 16.

We have provided a delivery valve 20 for the tank 8, which is adapted to deliver a restricted flow of water to the delivery tank 6. The valve 20 may consist of an ordinary plug valve and is preferably so adjusted that it will deliver drops of water at regular intervals to the tank 6. We also provide a stop valve 21, which is adapted to cut off the flow of water to the valve 20. The stop valve is provided so that the flow of water may be turned on and off without varying the adjustment of the valve 20.

The delivery tank 6 is mounted on a lever 22, which is pivotally mounted on a support 23, located within the casing 7 of the feeder. The weight of the tank 6 is slightly overbalanced by a weight 24, which is mounted on the rod, so that the tank will swing from the emptying to the filling position, when it is empty. The weight 24 is adjustable along the rod, so that it can be made to overbalance the tank 6 greater or less amounts. A slotted guide 25 is provided for the rear end of the lever 22 and rubber stops are provided at each end of the slot for cushioning the lever at each end of its travel. Pivoted upon the guide 25 is a lever 26, whose inner end stands in the path of the end of the lever 22, and whose outer end normally rests upon the end of lever 27. This normal contact of lever 26 with lever 27 is obtained by making the outer end of lever 26 heavier than its inner end. Lever 27 is fulcrumed in a standard 27$^a$, which is secured to a base 27$^b$, which rests upon the bottom of the casing 7. Upon the end of the lever 27 is an adjustable weight 27$^d$.

The tank 6 is provided with an opening in the top, which receives the water delivered from the valve 20. A discharge port 28 is located in the side of the tank 6 and is so arranged that it is above the level of the water in the tank, when the tank is in the filling position, but will discharge all of the water from the tank, when the tank moves to the emptying position.

A finger 29 is mounted on the lever 22 and is adapted to engage an arm 31 of the gate 13 and to open the port 10, when the tank 6 moves from the filling to the emptying position. The finger extends through a sleeve 32, which is slidably mounted on the lever 22. A set screw is provided for locking the sleeve in adjusted positions along the lever 22, and a set screw is provided for locking the finger 29 in adjusted positions relatively to the sleeve. With this arrangement, the length of time that the port 10 is open, during the emptying operation of the tank 6, may be varied.

The operation of the feeder is as follows:—After the feed tank 5 has been filled with feed and a supply of water has been delivered to the tank 4, by suspending a full vessel 15 of water in the port 14, the flow of water through the valve 20 is adjusted, so that it will take a definite and predetermined time for the tank 6 to fill. The weight 24 is adjusted along the lever 22, so that it will move the tank 6 to the filling position, when empty. We have shown the tank in this position in full lines in Fig. 1. As the tank fills with water, the weight of the water will oppose the weight 27$^d$ on the end of the lever 27, and the lever 22, bearing upward against the inner end of the lever 26, will lower the outer end of said lever, which will raise the weight 27$^d$, and allow the lever 22 to pass the inner end of the lever 26 and will tip the tank 6 to the emptying position, such as shown in dotted lines in Fig. 1. In this position, the port 28 of the tank delivers the water from the tank through a port 35, provided in the casing 7. The port 35 is provided with piping which conducts the water to a trough or other vessel outside of the feeder. As soon as the tank 6 is empty, it is overbalanced by the weight 24 and swings to the filling position. In moving to the filling position, the end of the lever 22 strikes the inner end of the lever 26, lowers it and passes to a position underneath the inner end of said lever 26, as shown in Fig. 1. As the tank 6 moves down to the emptying position, the finger 29 contacts with the arm 31 and opens the gate 13, as has been described. The gate is held open until the arm 31 is released by the finger on the upward motion of the tank 6.

We have provided means, such as an ordinary lamp 36, for heating the water in the tank 7, and for keeping the feed in the tank 5 warm. The lamp 36 is preferably placed directly under the tank 4. With this arrangement, it will heat the water and keep the feed warm, without the danger of burning the feed, since the only heat imparted to the tank 5 is transmitted through the water.

The emptying operation of the tank 6 may be varied by varying the flow of water through the valve 20. This may be done, as has been described, by varying the adjustment of the valve 20. The amount of water delivered at each emptying operation may be varied by varying the position of the weight 27 along the bell crank 26, and also by varying the adjustment of the weight 24 along the lever 22.

What we claim is:—

1. In an animal feeder, a feed tank, a water tank, means for receiving water from the water tank and for delivering it from the feeder, and means actuated by said first-mentioned means for delivering feed from the feed tank.

2. In an animal feeding device, a feed tank, a water supply tank and delivery tank actuated by the weight of water in the delivery tank, means for delivering a regulable flow of water from the supply tank to the delivery tank, and means actuated by the delivery tank for delivering feed from the feed tank.

3. In an animal feeding device, a feed tank, a water supply tank, a swinging delivery tank actuated by the weight of water in it for delivering water from the feeder, means for delivering a regulable flow of water from the supply tank to the delivery tank, and means actuated by the delivery tank for delivering feed from the feed tank.

4. In a feeder, a feed tank, a water supply tank, a pivotally mounted delivery tank for receiving water from said supply tank and delivering it from said feeder, means actuated by said delivery tank for delivering feed from the feed tank, and means for warming the water and the feed in the water supply and feed tanks.

5. In a feeder, a feed tank, a supply tank, a pivotally mounted delivery tank, means for delivering regulable amounts of water from said supply tank to said delivery tank, adjustable means for counter-balancing the weight of water in said delivery tank for controlling the delivery of feed from said feed tank.

6. In an animal feeder, a feed tank, a supply tank, a delivery tank mounted on a pivotally mounted lever, means for counter-balancing the weight of said delivery tank, means for delivering a regulable flow of water to said delivery tank, adjustable means for yieldingly holding the delivery tank in a filling position, and means actuated by the delivery tank for delivering feed from the feed tank.

7. In a chicken feeder, the combination of a box, an inclined partition dividing the box into a feed tank and a water tank, a swinging door closing the delivery port of the feed tank, a valve in the water tank adapted to feed regulated amounts of water therefrom, a lever pivoted adjacent to the box, a water delivery chamber secured to the lever in a position to receive water from the water tank, a means of holding the delivery tank in an elevated position and adapted to be overbalanced by a predetermined amount of water, and a finger secured to the lever in a position such as to open the swinging door of the feed tank when the water in the delivery tank actuates the lever.

GEORGE NIEMAN..
ALBERT NIEMAN.

Witnesses:
WALTER F. MURRAY,
H. THORNTON BOGERT.

---

Copies of this patent may be obtained for five cents each, by addressing the "Commissioner of Patents, Washington, D. C."